US009860906B2

(12) United States Patent
Shaw et al.

(10) Patent No.: US 9,860,906 B2
(45) Date of Patent: Jan. 2, 2018

(54) METHOD, COMPUTER-READABLE STORAGE DEVICE AND APPARATUS FOR PROCESSING MACHINE-TO-MACHINE COMMUNICATIONS

(71) Applicant: AT&T Intellectual Property I, L.P., Atlanta, GA (US)

(72) Inventors: Venson Shaw, Kirkland, WA (US); Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 84 days.

(21) Appl. No.: 14/970,037

(22) Filed: Dec. 15, 2015

(65) Prior Publication Data
US 2017/0171873 A1    Jun. 15, 2017

(51) Int. Cl.
H04W 4/00        (2009.01)
H04W 72/10       (2009.01)
(Continued)

(52) U.S. Cl.
CPC ............ *H04W 72/10* (2013.01); *H04L 51/26* (2013.01); *H04W 4/005* (2013.01); *H04W 4/14* (2013.01); *H04W 76/023* (2013.01)

(58) Field of Classification Search
CPC ....... H04W 72/10; H04W 4/005; H04W 4/14; H04W 76/023; H04L 51/26
See application file for complete search history.

(56) References Cited

U.S. PATENT DOCUMENTS 8,566,414 B2   10/2013  Prevost et al.
9,026,595 B2    5/2015  Subramanian et al.
(Continued)

FOREIGN PATENT DOCUMENTS

CN    103442328    12/2013
EP      2926500    10/2015
(Continued)

OTHER PUBLICATIONS

Viswanathan, Harish, "Getting Read for M2M Traffic Growth," Techzine, techzine.alcatel-lucent.com, May 11, 2011. pp. 1-7, https://techzine.alcatel-lucent.com/getting-ready-m2m-traffic-growth Disclosure an article discussing current issues and innovations in M2M technologies featuring an application used to prioritize M2M transactions.
(Continued)

*Primary Examiner* — Robert Wilson

(57) ABSTRACT

A method, computer-readable storage device and apparatus for processing a machine-to-machine communication. For example, the method receives a request for transmission of the machine-to-machine communication in the communications network, wherein the machine-to-machine communication is between two dedicated machines operated by a customer of the communications network, determines an overall priority of the request, wherein the overall priority is based on a plurality of priority parameters, wherein the plurality of priority parameters comprises at least two of: a level of delivery service priority, a customer type priority, a location type priority, a sensor type priority, a registration status priority, a transmission status priority, and a bearer establishment priority, and transmits the machine-to-machine communication over the communications network to a destination, wherein the transmitting is based on the overall priority.

20 Claims, 3 Drawing Sheets

(51) Int. Cl.
*H04W 76/02* (2009.01)
*H04W 4/14* (2009.01)
*H04L 12/58* (2006.01)

(56) References Cited

U.S. PATENT DOCUMENTS

| | | | |
|---|---|---|---|
| 9,100,804 B2 | 8/2015 | Draznin | |
| 9,113,283 B2 | 8/2015 | Foti | |
| 9,167,374 B2 | 10/2015 | Geltner et al. | |
| 2012/0178436 A1* | 7/2012 | Fan | H04W 76/027 455/422.1 |
| 2013/0003543 A1 | 1/2013 | Ludwig | |
| 2013/0182607 A1 | 7/2013 | Kim et al. | |
| 2013/0203399 A1* | 8/2013 | Gupta | H04W 28/12 455/418 |
| 2014/0177590 A1 | 6/2014 | Sirotkin et al. | |
| 2014/0226470 A1 | 8/2014 | Kim | |
| 2014/0233514 A1* | 8/2014 | Lee | H04W 4/005 370/329 |
| 2014/0317261 A1 | 10/2014 | Shatzkamer et al. | |
| 2014/0324973 A1 | 10/2014 | Goel et al. | |
| 2014/0372147 A1 | 12/2014 | White | |
| 2015/0019746 A1 | 1/2015 | Shatzkamer et al. | |
| 2015/0099555 A1* | 4/2015 | Krishnaswamy | H04W 4/06 455/509 |
| 2015/0109915 A1 | 4/2015 | Gassi | |
| 2015/0118988 A1* | 4/2015 | Shaw | G08B 23/00 455/404.1 |
| 2015/0131434 A1 | 5/2015 | Lee et al. | |
| 2015/0304113 A1 | 10/2015 | Nix | |
| 2015/0350348 A1* | 12/2015 | Yin | H04W 4/18 709/202 |
| 2016/0113025 A1* | 4/2016 | Shaw | H04W 72/10 455/450 |
| 2016/0164730 A1* | 6/2016 | Wang | H04L 41/0853 709/221 |
| 2016/0262045 A1* | 9/2016 | Yang | H04W 28/0289 |

FOREIGN PATENT DOCUMENTS

| | | |
|---|---|---|
| WO | WO 2014/182665 | 11/2014 |
| WO | WO 2015/143416 | 9/2015 |
| WO | WO 2015/164387 | 10/2015 |

OTHER PUBLICATIONS

"Ericsson innovations expedite adoption of 'Internet of Things'," Ericsson—Press Release, ericsson.com, Sep. 1, 2015. pp. 1-5. http://www.ericsson.com/news/1948879 Discloses a network far IoT featuring a new suite of software and ecosystem advances.

Mostafa, Ahmed Elhamy, "Statistical priority-based uplink scheduling for M2M communications", *Digital Archive and Research Repository*. 2015. pp. 1.

Chen, Beichen, "Class Based Overall Priority Scheduling for M2M communications over LTE Networks", *IEEE XPlore*. 2015. pp. 1-5.

Giluka, Makesh Kumar "Class Based Dynamic Priority Scheduling for Uplink to Support M2M Communications in LTE". Feb. 2014. pp. 1-3.

* cited by examiner

METHOD, COMPUTER-READABLE STORAGE DEVICE AND APPARATUS FOR PROCESSING MACHINE-TO-MACHINE COMMUNICATIONS

The present disclosure relates generally to methods, computer-readable media and devices for processing machine-to-machine communications in a communications network.

BACKGROUND

Machine-to-machine (M2M) communications provide huge growth opportunities for communications network service providers, e.g., both cellular network operators and mobile service providers (broadly network service providers). At the same time, the large growth of M2M communications also presents some challenges to the underlying communications networks operated by these network service providers.

SUMMARY

In one embodiment, the present disclosure provides a method, computer-readable storage device and apparatus for processing a machine-to-machine communication. For example, the method receives a request for transmission of the machine-to-machine communication in the communications network, wherein the machine-to-machine communication is between two dedicated machines operated by a customer of the communications network, determines an overall priority of the request, wherein the overall priority is based on a plurality of priority parameters, wherein the plurality of priority parameters comprises at least two of: a level of delivery service priority, a customer type priority, a location type priority, a sensor type priority, a registration status priority, a transmission status priority, and a bearer establishment priority, and transmits the machine-to-machine communication over the communications network to a destination, wherein the transmitting is based on the overall priority.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, computer-readable storage device and apparatus for processing machine-to-machine communications in a communications network. As discussed above, machine-to-machine (M2M) communications provide huge growth opportunities for communications network service providers. It is anticipated that hundreds of millions of M2M communications may traverse across a communications network on a daily basis. In fact, as the number of devices such as Internet of Things (IoT) devices, are adopted and deployed, the volume of M2M communications will grow exponentially. For example, the IoT devices refer to the growing network of electronic objects that may have an Internet Protocol (IP) address for Internet connectivity, and the communication that occurs between these electronic objects and other Internet-enabled devices and systems. However, the communications network does not capture or analyze any of the M2M communications. Rather, the communications network simply passes the M2M communications along the communications network to a destination without any regards to the content and/or origin of the M2M communications.

For example, M2M communications may be generated by sensor devices that are used to automatically measure various parameters such as power consumption, a temperature, an inventory level, a chemical level, a detected error, a monitored activity or event, e.g., a detected motion, a detected entry or exit of a monitored area, and the like. These sensors may take measurements continuously, e.g., over the course of: a minute, an hour, a day, a week and/or a month. As a result, hundreds of millions of messages may be generated that are sent across the communications network on a regular basis.

However, the communications network does not capture or analyze any of the M2M communications. Without the ability to differentiate different types of M2M communications, the communications network may perform poorly in attempting to forward such a large volume of ever growing M2M communications across the network service provider's communications network. Thus, one embodiment of the present disclosure analyzes the M2M communications to determine the priority of the M2M communications. In turn, the present disclosure will determine the manner in which the M2M communications will be processed, e.g., how the M2M communications will be transmitted to their respective destinations, whether the M2M communications will be stored within the communications network itself, whether the M2M communications will undergo further analysis within the communications network, and so on.

Figure 1:
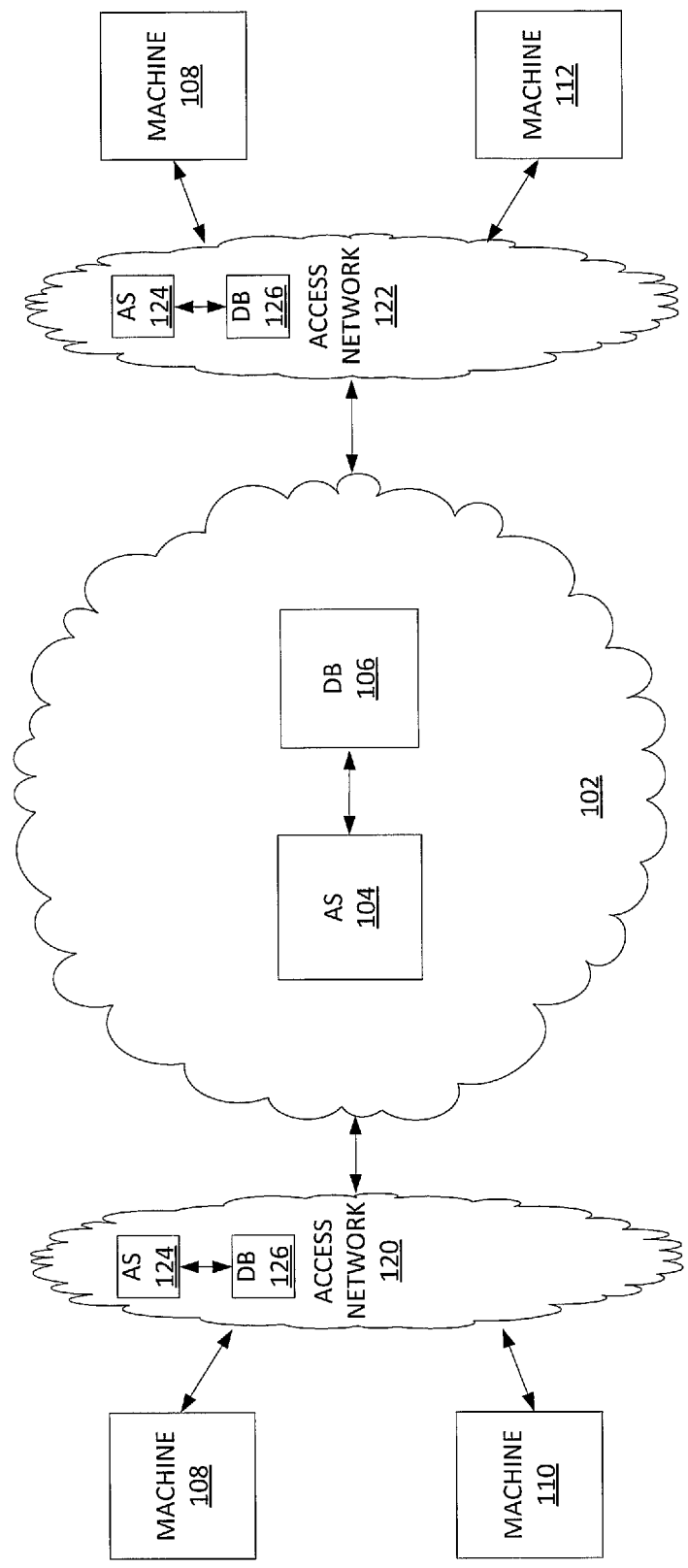
FIG. 1 illustrates one example of a communications network of the present disclosure.

FIG. 1 is a block diagram depicting one example of a communications network 100. For example, the communications network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G and the like), a long term evolution (LTE) network, and the like, related to the current disclosure. It should be noted that an IP network is broadly defined as a network that uses Internet Protocol to exchange data packets.

In one embodiment, the communications network 100 may include a core network 102. The core network 102 may include an application server (AS) 104, e.g., a dedicated database server. The AS 104 may be deployed as a separate hardware device embodied as a dedicated computer (e.g., the computer 300 illustrated in FIG. 3). In another embodiment, the AS 104 may be deployed as part of another network element in the core network 102, such as for example, a border element, a gateway, a firewall, a call control element, a router, a switch, and the like. In one embodiment, the AS 104 may be configured with computer-readable instructions to provide the functions as disclosed below, e.g., the functions as disclosed below with respect to FIG. 2, for supporting M2M communications.

The core network 102 may also include a database (DB) 106 in communication with the AS 104. The DB 106 may store certain portions of the M2M communications as directed by the AS 104. For example, a large volume of M2M communications may traverse over the network 100, e.g., over the core network 102 or one or more the access networks 120 and 122. Under the instruction of the AS 104, a portion of the M2M communications may be stored in DB 106. The AS 104 may access the DB 106 at any time to retrieve the stored M2M communications for analysis.

In one embodiment, the network 100 may comprise one or more machines, e.g., dedicated machines, 108, 110 and 112, one or more access networks 120 and 122 of the same operator or different operators (e.g., a wired and a wireless access) and one or more third party enterprise subscribers (broadly customers), e.g., operators of machines 110 and 112. In one embodiment, the machines 108, 110 and 112 may be any type of hardware machine capable of communicating over the communications network 100. For example, the dedicated machines 108, 110 and 112 may be any type of dedicated hardware devices (broadly dedicated electronic devices with circuitry), e.g., a dedicated controller, a dedicated processor, an appliance such a refrigerator, a set top box, a modem, a terminal adaptor, and a sensor with a communication module (e.g., a temperature sensor, a motion sensor, a pressure sensor, an optical sensor, a camera sensor, a proximity sensor, a speed sensor, a humidity sensor, a visible light sensor, an infrared sensor, an acceleration sensor, a current sensor, a voltage sensor, a biosensor, a flow sensor, a contact sensor, and the like). However, a "dedicated machine" as defined herein, does not consider a general purpose computing device such as a desktop computer, a laptop computer, a computing tablet, or a smart phone that has a display and input/output devices such as a keyboard, a disk drive, and the like to be a "machine" within the scope of the present disclosure. Said another way, the machine-to-machine communications from "dedicated machines" are limited to communications between different machines that are specifically programmed or configured to perform dedicated tasks.

For example, a dedicated temperature sensing module is programmed to report a measured temperature, a dedicated motion sensing module is programmed to report a detected motion, a dedicated contact sensing module is programmed to report a detected loss or engagement of a contact, a dedicated pressure sensing module is programmed to report a measured pressure, and so on. In another example, a dedicated controller is programmed to report a potential fire condition when a measured temperature is received from a temperature sensor that is above a predetermined temperature threshold, a dedicated controller is programmed to report a trespass condition when a number of detected motion signals is received from a plurality of motion sensors, a dedicated controller is programmed to report an entry or exit condition when a loss of contact signal is received from a contact sensor, e.g., deployed on a door or entry way, a dedicated controller is programmed to report a hazardous condition when a measured pressure is received from a pressure sensor that is above a predetermined pressure threshold, and so on. In other words, M2M communications are transmitted between dedicated machines that are deployed and preconfigured to perform a particular task, e.g., fire detection, security monitoring, inventory monitoring, chemical level monitoring, motion detection, hazardous condition monitoring, and so on. Said yet in another way, dedicated machines once programmed and deployed are not intended to be operated by human operators such as computers, laptops and smart phones that are directly operated by humans.

It should be noted that although only four dedicated machines are illustrated in FIG. 1, any number of hardware machines may be deployed. In addition, the dedicated machines 108, 110 and 112 may be located remotely from one another or near one another. For example, in one scenario, machine 110 may be a centralized controller operated by a first enterprise customer (e.g., a first customer such as a home security service provider) to detect potential fire conditions, where the centralized controller is configured to communicate with a plurality of dedicated machines 108 (e.g., temperature sensors) deployed over a plurality of different physical locations. In another scenario, machine 112 may be a centralized controller operated by a second enterprise customer (e.g., a second customer such as a food delivery service provider) to detect low inventory conditions, where the centralized controller is configured to communicate with a plurality of dedicated machines 108 (e.g., image sensors, counting devices, code scanning devices (e.g., bar code scanner or QR code scanner)) deployed over a plurality of different physical locations for detecting when a volume of monitored goods falls below a predefined threshold. In yet another scenario, machine 110 may be a centralized controller operated by a third enterprise customer (e.g., a pool maintenance service provider) to detect low chlorine conditions, where the centralized controller is configured to communicate with a plurality of dedicated machines 108 (e.g., chemical sensors deployed in swimming pools) deployed over a plurality of different physical locations for detecting when a level of chlorine falls below a predefined threshold. In yet another scenario, machine 112 may be a centralized controller operated by a fourth enterprise customer (e.g., a health care or nursing home service provider) to detect overturned wheelchair conditions, where the centralized controller is configured to communicate with a plurality of dedicated machines 108 (e.g., orientation sensors deployed on wheelchairs) deployed over a plurality of different physical locations for detecting when a wheelchair is in an orientation or state that is deemed to be in an overturned orientation or state. The above illustrated scenarios should not be interpreted as limitations of the present disclosure, but instead, should be interpreted as showing the numerous types of field of uses that can employ a large number of dedicated machines where M2M communications will be supported and processed.

In one embodiment, the access networks 120 and 122 may be any type of access network such as a cellular network, a wireless network, a wireless-fidelity (Wi-Fi) network, a PSTN network, an IP network and the like. The access networks 120 and 122 may be operated by the same operator or by different operators. The access networks 120 and 122 and the core network 102 may include additional network elements that are not disclosed. For example, the access networks 120 and 122 and the core network 102 may also include border elements, gateways, firewalls, routers, switches, call control elements, various application servers (not shown) and the like.

In one embodiment, the third party enterprise subscribers, e.g., operating dedicated machines 108, 110 and 112, may be various third party enterprise customers who subscribe to a service for processing the M2M communications. For example, the third party enterprise subscribers may each pay a fee for subscribing to the M2M communications handling service offered by the network service provider that is operating the core network, and/or access networks. In other words, the third party enterprise subscribers provide a fee to the network service provider so that the M2M communications between dedicated machines operated by the third party enterprise subscribers will be handled in a timely manner or mission oriented manner. Said another way, a medical service provider will subscribe to a service where M2M communications between various dedicated machines (e.g., orientation sensors and a dedicated controller) will be received and forwarded to the intended destinations to meet the mission requirement of a medical service provided by the medical service provider. For example, a nursing home service provider may want to be notified immediately if one of its wheelchairs in a nursing home is detected to be overturned. This will allow the nursing home service provider to quickly be notified and to respond to a potential life threatening condition or a potential injury condition suffered by a patient who is operating a wheelchair.

It should be noted that although two third party enterprise subscribers are illustrated in FIG. 1, any number of third party enterprise subscribers may subscribe to the service for processing M2M communications. In one embodiment, the third party enterprise subscribers may be located remotely from one another or located near one another.

In one embodiment, the machines 108, 110 and 112 may belong to the third party enterprise subscribers. In addition, the third party enterprise subscribers may have their own customers who are using the machines 108, 110 and 112. For example, the machine 108 may be a sensor that measures electricity usage in kilowatts for a home owner that is a customer of a power company (a third party enterprise subscriber). In turn, the power company may subscribe to a service for processing M2M communications from the network service provider or operator of the communications network 100. In another embodiment, the machine 108 may be a sensor that measures a chlorine level in a pool of a home owner who is a customer of a pool maintenance servicing company (a third party enterprise subscriber). Again, the pool servicing company may subscribe to a service for processing M2M communications from the network service provider of the communications network 100.

In one example, the network service provider of the communications network 100 may provide a communication session over an interface (e.g., a web interface, an application on a client, an interactive voice response menu, and the like) with the third party enterprise subscriber. The communication session is used to allow the third party enterprise subscriber to provide necessary information (e.g., status information or profile information) to identify which dedicated machines, e.g., sensors and controllers, belong to the third party enterprise subscriber, one or more parameters relating to the operations of these dedicated machines, the level of service that the third party enterprise customer wants to subscribe to, and the like.

In one embodiment, the present method for processing M2M communications offers a plurality of different levels of delivery service, e.g., a "real time" delivery service, a "near real time" delivery service, and a "non-real time" delivery service. The "real time" delivery service is a delivery service where upon a receipt of a M2M communication, the network service provider will attempt to deliver the received M2M communication immediately, limited only by the processing delay that is normally experienced in processing and forwarding the M2M communication over the physical architecture of the underlying network, e.g., switches, routers, links and the like, to a destination node intended by the M2M communication. The "near real time" delivery service is a delivery service where upon a receipt of a M2M communication, the network service provider will attempt to deliver the received M2M communication immediately only if there are no outstanding real time M2M communications that need to be delivered first. In other words, "near real time" M2M communications are subordinate or are of a lower priority when compared to "real time" M2M communications. In another example, the network service provider will deliver one near real time M2M communication for every five (5) real time M2M communications that are delivered. In this example, near real time M2M communications will still be delivered even when there are outstanding real time M2M communications to be delivered, but the transmission ratio between near real time M2M communications and real time M2M communications is set in a manner that favors the transmission of a greater number of real time M2M communications as compared to near real time M2M communications for a defined period of time. Finally, the "non-real time" delivery service is a delivery service where upon a receipt of a M2M communication, the network service provider will attempt to deliver the received M2M communication only if there are no outstanding real time or near real time M2M communications that need to be delivered first. In other words, "non-real time" M2M communications are subordinate or are of a lower priority when compared to "real time" and "near real time" M2M communications. In another example, the network service provider will deliver one non-real time M2M communication for every fifty (50) real time M2M communications that are delivered. In yet another example, "non-real time" M2M communications are only delivered during off-peak hours, e.g., between 2:00 AM-4:00 AM.

Thus, the different levels of delivery service that can be subscribed by a third party enterprise customer may serve as a priority measure or priority parameter that can be used by the network service provider to differentiate the different needs of different third party enterprise customers. Given the enormous amount of M2M communications that must be delivered over the network 100, the present disclosure allows the network service provider to use a priority measure that can be used to make better M2M communication routing decisions. In one embodiment, the network service provider will have different subscription fees for different levels of delivery service, e.g., "real time" delivery service will incur the highest fee, "near real time" delivery service will incur an average fee, and "non-real time" delivery service will incur the lowest fee. For example, a hospital may opt to subscribe to a "real time" delivery service, whereas a utility company monitoring operating status of solar panels deployed at residential properties may opt to subscribe to a "near real time" delivery service, and whereas a swimming pool maintenance company monitoring chlorine levels of swimming pools located at residential properties may opt to subscribe to a "non-real time" delivery service.

In another example, the type of third party enterprise customers may serve as another priority measure or priority parameter to determine how the M2M communications will be processed. In one embodiment, the present disclosure provides three different customer type priorities, e.g., a high customer type priority, a medium customer type priority, and a low customer type priority. For example, a high customer type priority can be assigned to enterprise customers such as: a medical institution (e.g., a hospital, a nursing home, a medical clinic, a psychiatric ward, and the like), and/or a law enforcement, safety or first responder governmental agency, or a utility (e.g., a police station, a fire station, a prison, a coast guard station, a military installation, a border station, a power station, a water treatment plant, and the like). In another example, a medium customer type priority can be assigned to enterprise customers such as: a transportation hub (e.g., a train station, a bus depot, a shipping port, a ferry station, a bridge, a tunnel, and the like), an educational agency (e.g., a university, a school, a boarding school, a dormitory and the like), and/or an entertainment or sports venue (e.g., a stadium, a concert hall, a theater, an arena, and the like). In another example, a low customer type priority can be assigned to enterprise customers such as: a pool maintenance company, a restaurant chain, a supermarket chain, and the like.

In one example, the "customer type priority" can be used independent of the "level of delivery service priority" or in conjunction with the "level of delivery service priority" to ascertain how M2M communications will be processed in the network 100. For example, the network service provider may offer governmental agencies a very deep discount in subscription fees, e.g., a low level of delivery service priority that has a very low cost, but may still treat law enforcement M2M communications with a high priority due to the high customer type priority. Although only three different levels of customer type priorities are disclosed, it should be noted that any number of different levels of customer type priorities can be deployed.

In another example, the location of dedicated machines may serve as another priority measure or priority parameter to determine how the M2M communications will be processed. In one embodiment, the present disclosure provides three different location type priorities, e.g., a high location type priority, a medium location type priority, and a low location type priority. For example, a high location type priority can be assigned to dedicated machines that are physically located at high value locations such as: a medical institution (e.g., a hospital, a nursing home, a medical clinic, a psychiatric ward, and the like), and/or a law enforcement location, a safety or first responder governmental location, or a utility location (e.g., a police station, a fire station, a prison, a coast guard station, a military installation, a border station, a power station, a water treatment plant, and the like). In another example, a medium location type priority can be assigned to dedicated machines that are physically located at medium value locations such as: a transportation hub (e.g., a train station, a bus depot, a shipping port, a ferry station, a bridge, a tunnel, and the like), an educational location (e.g., a university, a school, a boarding school, a dormitory and the like), and/or an entertainment or sports location (e.g., a stadium, a concert hall, a theater, an arena, and the like). In another example, a low location type priority can be assigned to dedicated machines that are physically located at low value locations such as: a residential home, a business location such as: a restaurant, a supermarket, a store and the like.

In one example, the "location type priority" can be used independent of the "level of delivery service priority" and/or "customer type priority," or in conjunction with the level of delivery service priority" and/or "customer type priority" to ascertain how M2M communications will be processed in the network 100. For example, a restaurant may opt to subscribe for a low level of delivery service and is classified by the network service provider as a low customer type priority being a restaurant. However, if the dedicated machine having a location related to a critical area of a location operated by the third party enterprise customer, e.g., a kitchen having a natural gas stove, or a basement having a natural gas backup generator and the dedicated machine is reporting a natural gas leak detection, then the "location type priority" may be sufficient, in and of itself, to bring about this particular M2M communication being treated with the highest priority.

In another example, the sensor type of dedicated machines may serve as another priority measure or priority parameter to determine how the M2M communications will be processed. In one embodiment, the present disclosure provides three different sensor type priorities, e.g., a high sensor type priority, a medium sensor type priority, and a low sensor type priority. For example, a high sensor type priority can be assigned to dedicated machines that are tasked with sensing certain types of conditions such as: a fire, a gas leak, presence of an explosive gas or liquid, and the like. In another example, a medium sensor type priority can be assigned to dedicated machines that are tasked with sensing certain types of conditions such as: a water leakage, an open doorway, an open window, and the like. In another example, a low sensor type priority can be assigned to dedicated machines that are tasked with sensing certain types of conditions such as: a low inventory, a low water condition in a pool, a low chlorine condition in a pool, and the like.

In one example, the "sensor type priority" can be used independent of the various types of priorities as discussed above, or in conjunction with the various types of priorities as discussed above. For example, a gasoline service station may opt to subscribe for a low level of delivery service, is classified by the network service provider as a low customer type priority being a commercial establishment, and the location is deemed to be an unsecured outdoor location traversed by a large number of customers. However, if the dedicated machine is of a sensor type that is tasked with detecting gasoline spillage, e.g., on the outdoor floor of the gas service station where customers are filling their vehicles, then the "sensor type priority" may be sufficient, in and of itself, to bring about this particular M2M communication being treated with the highest priority. Although only three different levels of sensor type priorities are disclosed, it should be noted that any number of different levels of customer type priorities can be deployed.

In another example, the registration status of dedicated machines may serve as another priority measure or priority parameter to determine how the M2M communications will be processed. In one embodiment, the present disclosure provides three different registration status priorities, e.g., an "unregistered status" priority, a "registered status" priority, and a "recently registered status" priority. For example, an unregistered status priority can be assigned to dedicated machines that have not yet been registered, e.g., a dedicated machine that is currently not powered on will not be registered with the pertinent network, e.g., an access network. For example, many IoT devices may have a very limited power source or supply due to their limited size or the locations in which such IoT devices are deployed, e.g., remote locations without wired power sources. As such, to conserve power certain IoT devices may only be turned on briefly to transmit and/or receive M2M communications. In another example, a registered status priority can be assigned to dedicated machines that have been registered, e.g., a dedicated machine that is currently powered on and is registered with the pertinent network, e.g., an access network. In another example, a recently registered status priority can be assigned to dedicated machines that have been recently registered, e.g., a dedicated machine that is currently powered on and is registered with the pertinent network for a recent duration of time, e.g., within the last one minute, within the last five minutes, and so on.

In one example, the "registration status priority" can be used independent of the various types of priorities as discussed above, or in conjunction with the various types of priorities as discussed above. For example, a dedicated controller may send an activation signal to a chlorine sensor in a swimming pool to power on and to provide a chlorine level measurement. Since the chlorine sensor may be in an unregistered state, such M2M communication may be deemed to be of a lower priority when compared to a registered sensor that is already in a registered state, e.g., a chemical sensor that is registered with the network and tasked with detecting the presence of gasoline vapor. In yet another example, the length of time that a dedicated machine has been registered with a network can be used as a differentiating factor, e.g., a dedicated machine that has been registered "longer" as measured in time with a network when compared to another dedicated machine may be deemed to be a higher priority dedicated machine. One rationale is that dedicated machines that are continuously registered may be performing higher priority monitoring functions as compared to other dedicated machines that are periodically activated to make a measurement. The "recently registered status" can be defined for a dedicated machine that has been registered within a predefined period of time, e.g., within the last five minutes. Once the dedicated machine has been registered for more than the last five minutes, then the dedicated machine can be deemed to be in the registered state. In one example, M2M communications for dedicated machines that are "recently registered" may be deemed to be of a lower priority when compared to a registered sensor that is already in a "registered" state. Although only three different levels of registration status priorities are disclosed, it should be noted that any number of different levels of registration status priorities can be deployed.

In another example, the transmission status of dedicated machines may serve as another priority measure or priority parameter to determine how the M2M communications will be processed. In one embodiment, the present disclosure provides three different transmission status priorities, e.g., an "active transmission status" priority, an "idle transmission status" priority, and a "sleep transmission status" priority. For example, an active transmission status priority can be assigned to dedicated machines that are currently sending and receiving M2M communications, e.g., an optical sensor (e.g., an image capturing sensor such as a camera) actively sending captured images to a receiver, where an intruder has been detected. In another example, an idle transmission status priority can be assigned to dedicated machines that are not currently sending and receiving M2M communications, e.g., an optical sensor that is on stand-by mode or is actually capturing images, but the captured images are not being sent to a receiver. In another example, a sleep transmission status priority can be assigned to dedicated machines that are not currently sending and receiving M2M communications and are not able to send or receive M2M communications until woken up, e.g., an optical sensor that is not capturing any images and is in a sleep mode with a reduced power usage.

In one example, the "transmission status priority" can be used independent of the various types of priorities as discussed above, or in conjunction with the various types of priorities as discussed above. For example, a dedicated controller may send a "wake up" signal to an optical sensor to wake up from a sleep mode to capture an image, e.g., a dedicated controller may have received a detected motion signal from a motion sensor deployed in the same general area as the optical sensor. However, if another optical sensor (e.g., in an active transmission state) in the same general area is already currently engaged in the transmission of captured images, then the M2M communications of the optical sensor in an active transmission state will be treated as having higher priority as compared to M2M communications destined to a dedicated machine that is currently in a sleep transmission state.

Although only three different levels of transmission status priorities are disclosed, it should be noted that any number of different levels of transmission status priorities can be deployed.

In another example, the bearer establishment status of dedicated machines may serve as another priority measure or priority parameter to determine how the M2M communications will be processed. In one embodiment, the present disclosure provides a bearer establishment status priority that is based on one or more bearer parameters such as a bandwidth parameter (e.g., the maximum amount of data that can be sent over a channel or medium), a throughput parameter (e.g., the amount of data that actually travel over a channel or medium), and a latency parameter (e.g., the average time that a unit of data, e.g., a packet, takes to traverse a channel or medium), and so on. For example, a dedicated machine may be configured with a particular setting for bearer establishment status priority, e.g., a "high bearer establishment status priority" based on a high bandwidth parameter, a high throughput parameter, and a low latency parameter. In another example, a dedicated machine may be configured with a different setting for bearer establishment status priority, e.g., a "medium bearer establishment status priority" based on a medium bandwidth parameter, a medium throughput parameter, and a medium latency parameter. In another example, a dedicated machine may be configured with a different setting for bearer establishment status priority, e.g., a "low bearer establishment status priority" based on a low bandwidth parameter, a low throughput parameter, and a high latency parameter.

In one example, the "bearer establishment status priority" can be used independent of the various types of priorities as discussed above, or in conjunction with the various types of priorities as discussed above. For example, a dedicated controller may send a "wake up" signal to an optical sensor to wake up from a sleep mode to capture an image, e.g., a dedicated controller may have received a detected motion signal from a motion sensor deployed in the same general area as the optical sensor that needs to be woken up. However, even though the optical sensor has a "sleep transmission status" priority, if the optical sensor has a "high bearer establishment status priority," then the M2M communications to and from this previously sleeping optical sensor may still be treated with a high priority given that the enterprise customer has designated this particular sensor as having a "high bearer establishment status priority." For example, a high resolution camera may be subsequently activated from a sleep mode only after several other less power-consuming sensors having reported confirming signals necessary to active the high resolution camera, e.g., a first sensor detecting motion in a monitored room, a second sensor detecting a rise in temperature in the monitored room, a third sensor detecting an infrared signal in the monitored room, and so on. Although only three different levels of bearer establishment status priorities are disclosed, it should be noted that any number of different levels of bearer establishment status priorities can be deployed.

Returning to FIG. 1, in one embodiment, once the status and profile information of the dedicated machines of each third party enterprise subscriber have been collected, stored and catalogued in the DB 106, the AS 104 may receive, store and process the M2M communications from the respective dedicated machines 108, 110 or 112 according to the various type of priorities as discussed above. In one embodiment, the M2M communications may be sent as short messages, e.g., a short message service (SMS) message or a multimedia messaging service (MMS) message. In one embodiment, the M2M communications may include data related to a parameter that the sensor is assigned to measure or monitor, identification of the sensor, a third party enterprise subscriber that owns the sensor, a time stamp, a location of the sensor, and the like.

In one embodiment, AS 104 stores a portion of the received M2M communications in the DB 106. In other words, in one embodiment M2M communications generated by the dedicated machines 108, 110 and 112 would not be sent over the communications network 100 to a respective one of the third party enterprise subscribers in real time. As discussed above, the communications networks in the past would perform no analysis on the M2M communications. In contrast, one embodiment of the present disclosure receives the M2M communications destined for third party enterprise subscribers such that the M2M communications will be processed in accordance with the various priorities as discussed above. In some instances, based on the priorities, some M2M communications may not reach the third party enterprise subscribers in real time. Rather, some of the M2M communications are stored temporarily in the DB 106.

In one embodiment, the functions performed in the core network 102 can also occur in the access networks, e.g., in access networks 120 and 122. Thus, each of the access networks 120 and 122 may also have dedicated AS 124 and DB 126 to perform the functions as discussed for AS 104 and DB 106. In other words, the processing of the M2M communications as discussed above can be performed closer to the dedicated machines instead of having to forward the M2M communications to the core network for handling. Processing the M2M communications at the access networks 120 and 122 using the present disclosed methods may alleviate the amount of delay in the overall network 100. For example, lower priority M2M communications can be stored in the access network temporarily before being sent to the core network for transmission to their final destinations. For example, pool sensors reporting chlorine levels throughout the day can be captured and stored in the DB 126 of access network 120. During non-peak hours, e.g., between 2:00 AM-4:00 AM, the stored M2M communications can then be sent to the core network 102 for delivery to their final destinations.

Thus, the AS 104 or AS 124 is able to perform an analysis on the M2M communications based on various priority parameters associated with the M2M communications for the purpose of determining how the M2M communications will be processed for transmission. In one embodiment, the AS 104 or AS 124 analyzes the M2M communications as the AS 104 or AS 124 receives the M2M communications.

Figure 2:
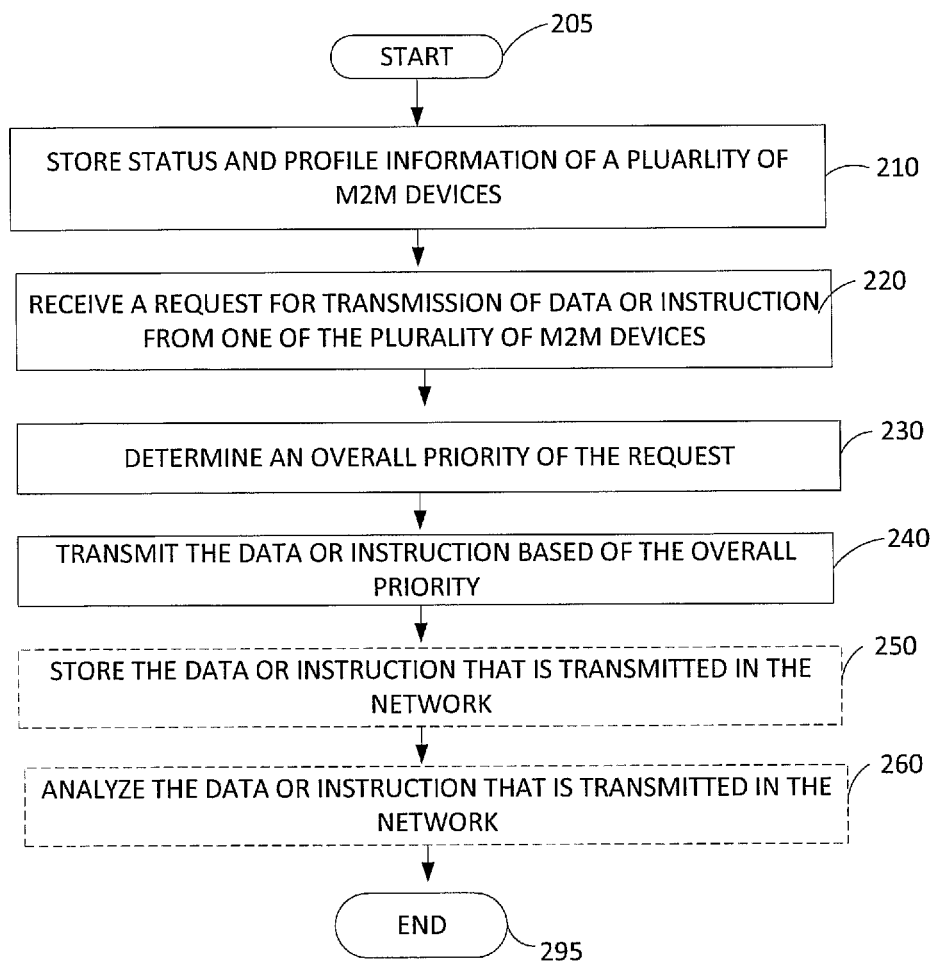
FIG. 2 illustrates a flowchart of an example method for processing machine-to-machine communications in a communications network.
Figure 3:
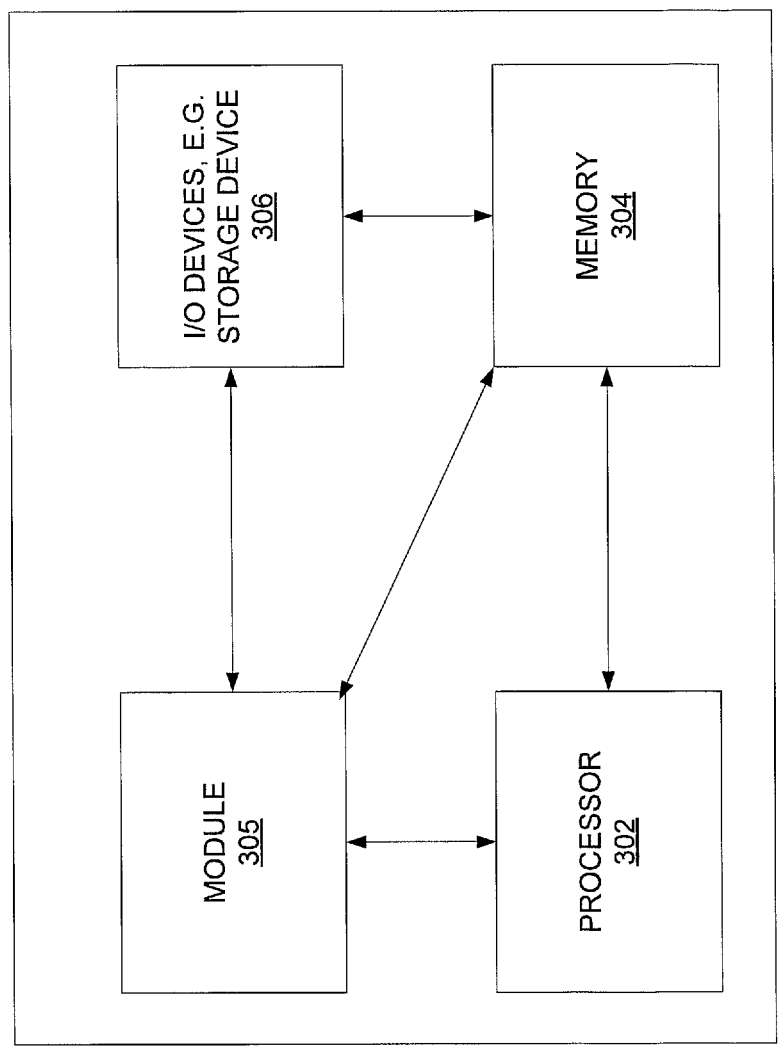
FIG. 3 illustrates a high-level block diagram of a dedicated computer suitable for use in performing the functions described herein.

FIG. 2 illustrates a flowchart of an example method 200 for processing machine-to-machine communications in a communications network. In one embodiment, the method 200 may be performed by an application server, e.g., the AS 104 or a dedicated computer as illustrated in FIG. 3 and discussed below.

The method 200 starts at step 205. At step 210, the method 200 may receive and store status and profile information of a plurality of dedicated machines, e.g., M2M devices. For example, status and profile information may comprise: enterprise customer identification information, level of delivery service information, enterprise customer type information, location of dedicated machines information, sensor type information for each of the dedicated machines, registration status information for each of the dedicated machines, transmission status information for each of the dedicated machines or for each of the enterprise customers, and/or bearer establishment information for each of the dedicated machines or for each of the enterprise customers. Such status and profile information can be gathered and stored during the service subscription process and/or can be dynamically gathered and stored as the dedicated machines are deployed and operated.

At step 220, the method 200 may receive a request for transmission of a M2M communication, e.g., data or instructions from one of the plurality of M2M devices, where the M2M communication is between two dedicated machines operated by an enterprise customer of the communications network. For example, a sensor may report a measurement or a detected event to a controller, where both the sensor and controller are owned and/or operated by the same enterprise customer. In another example, a dedicated controller may send an instruction to a sensor instead.

At step 230, the method 200 determines an overall priority of the request. For example, the overall priority may take into account a plurality of priority parameters as discussed above. For example, the plurality of priority parameters may comprise: a level of delivery service priority, a customer type priority, a location type priority, a sensor type priority, a registration status priority, a transmission status priority, and a bearer establishment priority. For example, the overall priority may account for at least two of the priority parameters, e.g., using at least two of the above priority parameters to determine whether the M2M communication will be transmitted in real time, near real time, or non-real time.

At step 240, the method 200 transmits the data or instruction based on the overall priority that is determined in step 230. For example, the transmission of the data or instruction can be performed in real time. Alternatively, the transmission of the data or instruction can be performed in near real time or in non-real time.

At optional step 250, the method 200 may optionally store the M2M communications that have been transmitted in a database of the communications network, e.g., in DB 106 or DB 126. After the M2M communications are stored, the AS 104 or AS 124 may fetch the required M2M communications to be analyzed in optional step 260, e.g., at a later time. The analysis may comprise various analytical parameters, triggering events, and root causes provided by the enterprise customers. In other words, the network service providers may further offer an additional service where M2M communications can be analyzed on the behalf of the enterprise customers, e.g., to determine an underlying cause for certain detected conditions and the like. In other words, the enterprise customers may not have the necessary computational resources and/or storage resources to process the numerous M2M communications. Such services can then be provided by the network service provider. The method 200 ends at step 295.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

FIG. 3 depicts a high-level block diagram of a dedicated computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for processing machine-to-machine communications in a communications network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a dedicated computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for processing machine-to-machine communications in a communications network (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, direct-ing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for processing machine-to-machine communications in a communications network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a machine-to-machine communication in a communications network, the method comprising:
    receiving, by a processor, a request for transmission of the machine-to-machine communication in the communications network, wherein the machine-to-machine communication is between two dedicated machines operated by a customer of the communications network;
    determining, by the processor, an overall priority of the request, wherein the overall priority is based on a plurality of priority parameters, wherein the plurality of priority parameters comprises at least two of: a level of delivery service priority, a customer type priority, a location type priority, a sensor type priority, a registration status priority, a transmission status priority, and a bearer establishment priority; and
    transmitting, by the processor, the machine-to-machine communication over the communications network to a destination, wherein the transmitting is based on the overall priority.

2. The method of claim 1, wherein the machine-to-machine communication comprises a short message service message.

3. The method of claim 1, wherein the machine-to-machine communication is received from a controller of one of the two dedicated machines.

4. The method of claim 1, wherein the machine-to-machine communication is received from a sensor of one of the two dedicated machines.

5. The method of claim 4, wherein the machine-to-machine communication comprises data associated with a parameter that the sensor measures.

6. The method of claim 1, wherein the bearer establishment priority is based on at least one of: a bandwidth parameter, a throughput parameter, and a latency parameter.

7. The method of claim 1, wherein the level of delivery service priority is based on at least one of: a real time delivery service, a near real time delivery service, and a non-real time delivery service.

8. The method of claim 1, wherein the machine-to-machine communication is transmitted over the communications network in real time.

9. The method of claim 1, wherein the machine-to-machine communication is transmitted over the communications network in near real time.

10. The method of claim 1, wherein the machine-to-machine communication is transmitted over the communications network in non-real time.

11. The method of claim 1, further comprising:
storing, by the processor, the machine-to-machine communication that is transmitted in the communications network.

12. The method of claim 11, further comprising:
analyzing, by the processor, the machine-to-machine communication that is stored in the communications network.

13. A non-transitory computer-readable storage device storing a plurality of instructions which, when executed by a processor, cause the processor to perform operations for processing a machine-to-machine communication in a communications network, the operations comprising:
receiving a request for transmission of the machine-to-machine communication in the communications network, wherein the machine-to-machine communication is between two dedicated machines operated by a customer of the communications network;
determining an overall priority of the request, wherein the overall priority is based on a plurality of priority parameters, wherein the plurality of priority parameters comprises at least two of: a level of delivery service priority, a customer type priority, a location type priority, a sensor type priority, a registration status priority, a transmission status priority, and a bearer establishment priority; and
transmitting the machine-to-machine communication over the communications network to a destination, wherein the transmitting is based on the overall priority.

14. The non-transitory computer-readable storage device of claim 13, wherein the machine-to-machine communication comprises a short message service message.

15. The non-transitory computer-readable storage device of claim 13, wherein the machine-to-machine communication is received from a controller of one of the two dedicated machines.

16. The non-transitory computer-readable storage device of claim 13, wherein the machine-to-machine communication is received from a sensor of one of the two dedicated machines.

17. The non-transitory computer-readable storage device of claim 16, wherein the machine-to-machine communication comprises data associated with a parameter that the sensor measures.

18. An apparatus for processing a machine-to-machine communication in a communications network, the apparatus comprising:
a processor; and
a computer-readable storage device storing a plurality of instructions which, when executed by the processor, cause the processor to perform operations, the operations comprising:
receiving a request for transmission of the machine-to-machine communication in the communications network, wherein the machine-to-machine communication is between two dedicated machines operated by a customer of the communications network;
determining an overall priority of the request, wherein the overall priority is based on a plurality of priority parameters, wherein the plurality of priority parameters comprises at least two of: a level of delivery service priority, a customer type priority, a location type priority, a sensor type priority, a registration status priority, a transmission status priority, and a bearer establishment priority; and
transmitting the machine-to-machine communication over the communications network to a destination, wherein the transmitting is based on the overall priority.

19. The apparatus of claim 18, wherein the machine-to-machine communication is received from a sensor of one of the two dedicated machines.

20. The apparatus of claim 19, wherein the machine-to-machine communication comprises data associated with a parameter that the sensor measures.

* * * * *